United States Patent
Harkensee et al.

(10) Patent No.: US 7,962,352 B2
(45) Date of Patent: Jun. 14, 2011

(54) METHOD OF INSURING INDIVIDUALS USING GUARANTEED INSURANCE, TERM INSURANCE, AND NON-GUARANTEED INSURANCE

(75) Inventors: James Harkensee, Arlington Heights, IL (US); Charles Ritzke, West Dundee, IL (US)

(73) Assignee: Fidelity Life Association, Oak Brook, IL (US)

( * ) Notice: Subject to any disclaimer, the term of this patent is extended or adjusted under 35 U.S.C. 154(b) by 406 days.

(21) Appl. No.: 12/143,545

(22) Filed: Jun. 20, 2008

(65) Prior Publication Data

US 2009/0319303 A1   Dec. 24, 2009

(51) Int. Cl.
*G06Q 40/00*   (2006.01)

(52) U.S. Cl. .............................. 705/4; 705/35

(58) Field of Classification Search ................. None
See application file for complete search history.

(56) References Cited

U.S. PATENT DOCUMENTS

| | | | |
|---|---|---|---|
| 2002/0091610 A1* | 7/2002 | Smith | 705/36 |
| 2002/0165740 A1 | 11/2002 | Saunders | |
| 2003/0074233 A1 | 4/2003 | Lee | |
| 2003/0208385 A1 | 11/2003 | Zander et al. | |
| 2004/0181435 A9 | 9/2004 | Snell et al. | |
| 2004/0236612 A1 | 11/2004 | Heusinkveld et al. | |
| 2007/0021987 A1 | 1/2007 | Binns et al. | |
| 2007/0094053 A1 | 4/2007 | Samuels | |
| 2008/0082370 A1 | 4/2008 | Collins et al. | |

OTHER PUBLICATIONS

"Life Underwriting Requirements Guide", ING North America Insurance Corporation, Jan. 2009.
Fidelity Life Association—Optional Accelerated Death Benefit For Long Term Care and Terminal Illness—Optional Benefit, available prior to Jun. 20, 2007.
Fidelity Life Association—Optional Accelerated Death Benefit For Long Term Care—Optional Benefit, available prior to Jun. 20, 2007.
Fidelity Life Association—Optional Extension of Benefits, available prior to Jun. 20, 2007.
Fidelity Life Association—Level Term Optional Benefit, available prior to Jun. 20, 2007.
Fidelity Life Insurance—Lifetime Benefit Term—Brochure, available Sep. 2007.

(Continued)

*Primary Examiner* — Jason M Borlinghaus
(74) *Attorney, Agent, or Firm* — K&L Gates LLP

(57) ABSTRACT

A method of insuring a group of individuals includes purchasing a guaranteed insurance component and a decreasing term insurance component using a level premium received for each individual. The guaranteed component is based on relatively conservative risk assumptions, and provides a paid-up benefit upon cessation of payment of premiums if premiums have been paid for a designated number of years. Any excess interest is used to purchase a non-guaranteed component having a paid-up benefit based on relatively less conservative risk assumptions. The paid-up benefit of the guaranteed component and the term benefit combine to provide an in-force benefit. During an initial level benefit period, the non-guaranteed insurance component increases the paid-up benefit amount. Once the sum of the guaranteed benefit amount and the non-guaranteed benefit amount exceeds the in-force benefit, premiums are no longer owed and the coverage becomes fully paid-up.

40 Claims, 5 Drawing Sheets

OTHER PUBLICATIONS

Fidelity Life Association—Accidental Death Benefit Rider, available prior to Jun. 20, 2007.
Fidelity Life Association—Lifetime Benefit Term Certificate of Coverage, available prior to Jun. 20, 2007.
Fidelity Life Association—Guaranty Insurability—Optional Benefit, available prior to Jun. 20, 2007.
Fidelity Life Association—Lifetime Benefit Term—Policy, available prior to Jun. 20, 2007.
Fidelity Life Association—Payor Waiver of Premium Optional Benefit, available prior to Jun. 20, 2007.
Transactions of Society of Actuaries—Group Life Insurance with Paid-Up Values, Jun. 1955.
Fidelity Life Association—Actuarial Memorandum, Oct. 12, 2006.
Fidelity Life Association—Presentation to National Benefit Partners, Mar. 2, 2007.
Fidelity Life Association—Accidental Death Benefit Rider, available prior to Jun. 20, 2007.
Office Action dated Apr. 23, 2010 for U.S. Appl. No. 12/013,959.
Office Action dated May 3, 2010 for U.S. Appl. No. 12/013,962.

* cited by examiner

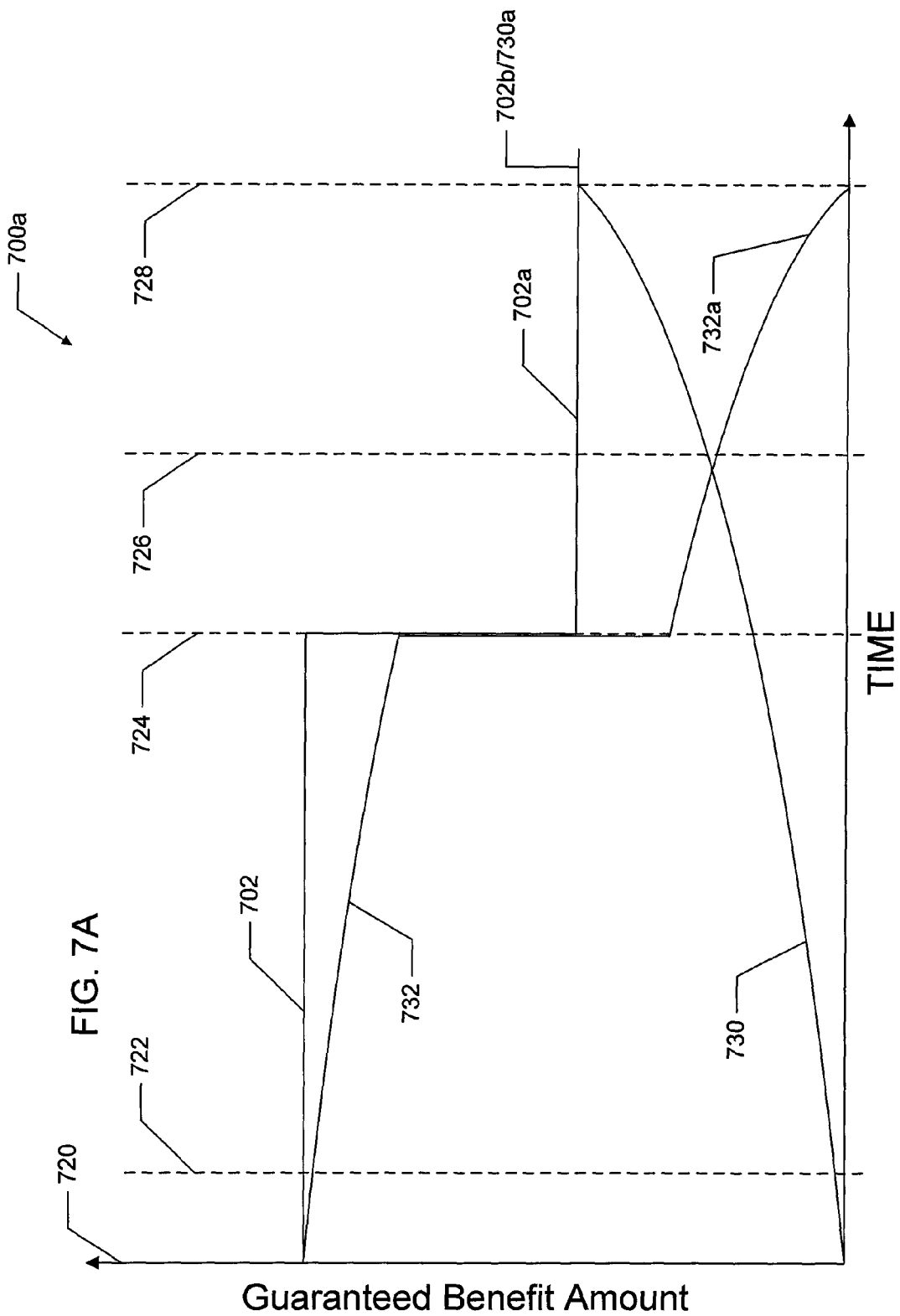

METHOD OF INSURING INDIVIDUALS USING GUARANTEED INSURANCE, TERM INSURANCE, AND NON-GUARANTEED INSURANCE

TECHNICAL FIELD

The present disclosure relates in general to life insurance, and in particular to methods for insuring one or more individuals by providing life insurance coverage that accumulates a paid-up benefit and provides a level in-force benefit in exchange for level premium payments.

BACKGROUND

Life insurance is a product sold by an insurer to an insured, wherein the insurer agrees to provide a benefit to one or more designated beneficiaries upon the occurrence of an insured event. The insurer and an insurance purchaser enter into a contract, whereby the insurer agrees to pay a sum of money (the benefit) upon the insured's death (the insured event). In exchange, the purchaser of the insurance policy agrees to pay fees at regular intervals (the premiums), the premiums being determined based on the insurance company's classification of the individual within its risk classification system. A life insurance policy is typically purchased by or on behalf of an individual to be insured, and upon purchasing the policy the purchaser designates one or more individuals or entities (the beneficiaries) to receive the benefit under the policy if and when an insured event occurs. Typically, the policy owner begins paying premiums coincident to commencement of coverage under the policy.

Insureds and other purchasers of insurance want insurance coverage that provides high benefit amounts in exchange for low premium payments. Because insurance represents a risk to the insurer, insurers want to provide coverage having low benefit amounts in exchange for high premium payments. These opposite incentives have inspired various types of life insurance to satisfy varying needs of insurers and insureds.

Permanent forms of life insurance provide an in-force benefit to a beneficiary upon the occurrence of an insured event anytime during the life of the insured, until an end-of-coverage time indicated by the end of a mortality table. Permanent insurance usually also provides a paid-up benefit, such that if the insurer ceases receiving premium payments owed for insurance coverage, the beneficiary will still receive any accumulated paid-up benefit upon occurrence of the insured event. However, permanent insurance typically provides a relatively low in-force benefit in exchange for relatively high premiums. The paid-up benefit available if an insured or other purchaser of coverage stops making required premium payments is typically even lower than the in-force benefit. Both the in-force benefit and the paid-up benefit may be so low that permanent insurance may not satisfy an insurance purchaser's goal of securing a substantial benefit to be distributed to a beneficiary upon the occurrence of an insured event.

Term insurance obligates an insurer to distribute a benefit to a beneficiary if an insured event occurs during the relatively short term of the coverage. Insureds or other purchasers of insurance on the behalf of the insured make one or more premium payments in exchange for term insurance coverage. Term insurance typically provides a relatively higher benefit than permanent insurance purchased for the same premium amount. However, term insurance does not provide a paid-up benefit. Moreover, term insurance typically provides coverage for a relatively short period of time; that is, it typically must be renewed for subsequent terms to provide a benefit to an insured for a relatively longer period, such as for the duration of the insured's life. Often, an insured must re-apply for term insurance and/or must prove that the insured is currently in good health to receive renewed term insurance coverage. Some insureds are therefore unable to re-purchase term insurance providing the same benefit amount as previous coverage in exchange for the same premium payments owed for previous coverage. Such insureds may thus be unable to continue to afford the desired insurance coverage. Since term insurance does not provide a paid-up benefit, a failure by an insured or other purchaser of coverage to pay premiums may result in a lack of insurance coverage.

Various combinations of the above types of insurance have been suggested to overcome the various problems noted with respect to coverage periods, premium payment amounts, benefit amounts, and paid-up benefits. However, no existing insurance product provides coverage having an adequately high benefit in exchange for adequately low premium payments while still providing paid-up insurance in case an insured or other insurance purchaser cannot continue making premium payments. Nor do existing insurance products enable an insured to secure such coverage in exchange for a level premium such that the coverage effectively extends for the duration of the life of the insured.

SUMMARY

The present disclosure relates generally to a method of insuring a group of individuals, and more particularly to a method of insuring the lives of a plurality of individuals over the course of a coverage period by providing a combination of paid-up insurance and term insurance. The method of insuring a group of individuals disclosed herein provides each of the individuals with life insurance for a predefined coverage period. Each insured individual remits level premium payments, or level premium payments are remitted on behalf of the insured individual, in exchange for life insurance coverage providing a guaranteed in-force benefit for the coverage period. The coverage guarantees each insured individual a first in-force level death benefit for a first portion of the coverage period and a second in-force level death benefit for a second portion of the coverage period. If the required level premiums are remitted as owed throughout a designated paid-up non-eligibility period, typically beginning at the onset of coverage, the insured is also guaranteed a paid-up benefit even if the insured subsequently ceases remitting the level premiums. The insured may not be provided a cash surrender value and may not be afforded the opportunity to borrow against the purchased insurance.

The insured is provided life insurance coverage which may include various combinations of three components: a guaranteed insurance component, a term insurance component, and a non-guaranteed insurance component.

During the first portion of the coverage period, a portion (i.e., some or all) of each of the level premiums received from an insured is used to purchase guaranteed insurance and term insurance. Moreover, during the first portion of the coverage period, the guaranteed insurance component may generate excess interest. If such excess interest is generated, a portion of the excess interest may be used to purchase so-called non-guaranteed insurance.

It should be appreciated that reference to this insurance component as non-guaranteed insurance refers to the fact that the purchase of such insurance is not guaranteed—that is, the accumulated paid-up insurance is not guaranteed to generate excess interest. If excess interest is generated, the non-guaranteed purchased using the generated excess interest increases the paid-up benefit by a predefined, known amount. Thus, the term non-guaranteed refers to a condition on whether the non-guaranteed insurance is purchased, not the amount of the benefit provided by the non-guaranteed insurance.

During the second portion of the coverage period, a portion of each of the level premiums is used to purchase guaranteed insurance. If non-guaranteed paid-up insurance has accumulated during the first portion of the coverage period, such that the paid-up value exceeds the in-force benefit, a portion of that non-guaranteed insurance may be used to purchase term insurance to increase the in-force benefit during the second portion of the coverage period.

In the beginning of the first portion of the coverage period, the majority of the in-force benefit results from the term insurance purchased with a portion of each premium payment. Guaranteed insurance is purchased with a portion of each level premium, so the guaranteed benefit accounts for an increasing portion of the in-force benefit as time passes during the first portion of the coverage period. The additional paid-up benefit resulting from each discrete purchase of guaranteed insurance may accumulate at a substantially uniform rate. The paid-up benefit of the accumulated guaranteed insurance component may thus provide an increasing percentage of the level in-force benefit.

Guaranteed insurance is purchased based on a set of assumptions about factors such as interest rates and mortality rates. The guaranteed insurance may A generate excess interest if these assumptions turn out to be conservative compared to reality. For example, an assumed interest rate or an assumed mortality rate underlying the purchase of guaranteed insurance may be lower than the actual interest rate or higher than the actual mortality rate over time. The excess interest may result from mortality credits and/or excess interest credits provided to the insurer.

Excess interest, if any, generated by the performance of the guaranteed insurance over time may be used to purchase so-called non-guaranteed insurance. Like guaranteed insurance, non-guaranteed insurance is also based on a set of assumptions, but the set of assumptions on which the non-guaranteed insurance is based is generally more favorable than the assumptions underlying the guaranteed insurance. The non-guaranteed insurance component provides a known paid-up benefit in addition to the guaranteed paid-up benefit. Although any accumulated benefit attributable to non-guaranteed insurance does not increase the in-force benefit of the disclosed coverage, it increases the available paid-up benefit.

A decreasing term insurance component accounts for the decreasing component of the in-force benefit not provided by the accumulated paid-up benefit (i.e., the sum of the guaranteed and the non-guaranteed paid-up benefits). The portion of each of the level premiums not used to purchase guaranteed insurance may be used to purchase term insurance having a term benefit. The term benefit may be equivalent to the difference between the in-force benefit and the accumulated paid-up benefit, such that the term benefit and the paid-up benefit together account for the level in-force benefit. The benefit from any term insurance purchased does not increase the accumulated paid-up benefit.

Term insurance generally becomes increasingly expensive as an insured ages or as the insured's health deteriorates. Thus, using a level premium amount to continue purchasing term insurance as the insured ages generally results in decreasing term benefits for subsequent terms. The term insurance component purchased during the first portion of the coverage period may be purchased using a substantially level portion of the level premium as an insured ages. Because the paid-up benefit continues to accumulate, combining the (increasing) accumulated paid-up benefit with the (decreasing) term benefit results in a level in-force benefit during the first portion of the coverage period.

During the first portion of the coverage period, the insured or other purchaser of insurance coverage may be provided an option to cease paying premium payments and still receive coverage such that if an insured event occurs, the insurer will make a distribution to a beneficiary. Since the disclosed coverage accumulates a paid-up benefit (which may include guaranteed and a non-guaranteed paid-up benefit components), the paid-up benefit may be available even after premium payments are no longer being made. Thus, the insurer may be obligated to distribute a paid-up benefit to the beneficiary despite the cessation of premium payments.

Access to the paid-up benefit may be limited by a paid-up non-eligibility period, which may begin with the first premium payment. During this period, which may be five years long, the purchaser of insurance coverage may be required to pay each owed premium. If the purchaser pays each required premium, the insurer may be obligated to enable the insured to later cease making payments and still receive coverage with a paid-up benefit. For example, if a purchaser of insurance coverage makes required premium payments for seven years, and an insured event occurs in the tenth year, the insurer may be obligated to provide a beneficiary with the paid-up benefit available after the seventh year regardless of the cessation of premium payments. It should be appreciated that in such a scenario, the amount of the benefit may be limited to the paid-up benefit accumulated at the time of the last timely premium payment, despite the insured event occurring years later.

After providing the first guaranteed level death benefit for the first portion of the coverage period, the method disclosed herein provides a second guaranteed level death benefit for the second portion of the coverage period. During the second portion of the coverage period, the in-force benefit provided may be lower than the in-force benefit provided during the first portion of the coverage period. The drop in the in-force benefit amount between the first and second portions of the coverage period may be substantial, such as a drop of 50% of the benefit amount. During the second portion of the coverage period, the entire amount of each premium payment received may be used to purchase guaranteed paid-up insurance. Thus, the premium payments made during the second portion of the coverage period may not be used to purchase term insurance.

The sum of the accumulated paid-up benefits provided by the guaranteed insurance component and the non-guaranteed insurance component may increase over time until it becomes equivalent to or exceeds the in-force benefit. This may occur during the first portion of the coverage period or during the second portion of the coverage period, such that the accumulated paid-up benefit equals or exceeds the reduced in-force benefit. When the accumulated paid-up benefit becomes equal to the in-force benefit, the coverage becomes fully paid-up and the purchaser of insurance coverage is no longer obligated to remit premium payments. After coverage becomes fully paid-up, it continues for the remainder of the coverage period. It should be appreciated that the sum of the guaranteed paid-up benefit and the non-guaranteed paid-up benefit may exceed the in-force benefit at any point during the coverage period, including during the first portion of the coverage period. It should be further appreciated that the coverage may be designed such that the guaranteed paid-up benefit equals the in-force benefit (i.e., the coverage is guaranteed to become fully paid-up) when the insured reaches a predefined age.

Rather than providing a decreased in-force benefit during the second portion of the coverage period, coverage according to the method disclosed herein may continue providing the full in-force benefit of the first portion of the coverage period during the second portion of the coverage period. To do this, One Year Term (OYT) insurance may be purchased using a portion of any accumulated non-guaranteed insurance. Although the entire level premium payment received may be committed to purchasing guaranteed paid-up insurance, the accumulated non-guaranteed insurance may enable OYT insurance to be purchased having a benefit sufficient to increase the in-force benefit to the same level as during the first portion of the coverage period. Even after the first level benefit coverage period expires, the in-force benefit may thus remain constant if excess interest was generated during the first portion of the coverage period to enable the purchase of non-guaranteed insurance. It should be appreciated that though a portion of the accumulated non-guaranteed insurance may be used to purchase OYT insurance, the total accumulated paid-up benefit may continue to increase.

As noted, when the sum of the paid-up benefit from the guaranteed component and the paid-up benefit from the non-guaranteed component exceeds the in-force benefit, the insured receives a fully paid-up benefit. If OYT insurance is purchased during the second portion of the coverage period (i.e., to increase the in-force benefit) and the paid-up benefit still equals or exceeds the in-force benefit, the coverage becomes paid-up at the higher in-force benefit.

In various embodiments, an insured is provided options to increase the value of the in-force benefit (e.g., by increasing the benefit or decreasing the premiums paid to secure the benefit amount) or to enable a portion of the in-force benefit to be disbursed prior to the occurrence of an insured event by electing various additional mechanisms for providing insurance coverage or for disbursing a portion of the in-force benefit.

For example, one or more premium payments may be waived or refused if the individual becomes disabled during the coverage period. The insured individual may still receive the in-force benefit upon an occurrence of an insured event, but may not be obligated to remit premium payments while disabled.

In another example, an individual may be provided a portion of the in-force benefit prior to the occurrence of an insured event based on physical or mental incapacity. A portion of the in-force benefit may be disbursed to the insured individual prior to an occurrence of the insured event if the individual is unable to provide care or protection for himself or herself. Similarly, a portion of the in-force benefit may be disbursed prior to an occurrence of the insured event if the individual is unable to perform, without assistance, at least two of: bathing, continence (e.g., control of the bowels or bladder), dressing, eating, toileting (e.g., physically accessing a bathroom), and ambulation. These disbursements may continue, even in excess of the in-force benefit, if the individual remains unable to provide his or her own care and/or protection.

Health problems suffered by the insured may also accelerate the disbursement of part or all of the in-force benefit. If an insured becomes terminally ill, at least a portion of the in-force benefit may be disbursed to the insured to pay for any accumulated expenses of being terminally ill. Alternatively, if the insured becomes disabled, at least a portion of the in-force benefit may be disbursed to the insured. These disbursements may be made only if the insured incurs costs from a care provider.

An individual may be permitted to remit additional premium payments in excess of the level premium owed during the first portion of the coverage period. In exchange for these additional premium payments, the individual may receive additional guaranteed insurance or additional term insurance. Any such additional guaranteed insurance may increase the paid-up benefit without impacting the in-force benefit, while any additional term insurance may provide a larger in-force benefit with no impact on the paid-up benefit. The insured may be given the option to decide and indicate whether to use the additional premium to purchase an additional paid-up benefit or an additional term benefit.

It is an advantage of the disclosed method of insuring a group of individuals to provide term insurance, guaranteed insurance, and non-guaranteed insurance to result in a level in-force benefit with an increasing paid-up benefit for substantially the duration of an insured's life.

It is a further advantage of the disclosed method to provide a paid-up benefit amount after a paid-up non-eligibility period to enable owed premiums to cease being paid but to nonetheless provide a benefit to the beneficiary upon the occurrence of an insured event.

It is a further advantage of the disclosed method to enable an individual to receive a portion of the in-force benefit prior to the occurrence of an insured event to aid in the health care needs of the insured individual.

It is a still further advantage of the disclosed method to enable an individual to increase the in-force benefit by adding additional term insurance or additional guaranteed insurance during the coverage period.

Additional features and advantages are described herein, and will be apparent from the following Detailed Description and the Figures.

BRIEF DESCRIPTION OF THE FIGURES

FIG. 7A is an enlarged, to-scale graph displaying an example of guaranteed paid-up and in-force benefits available over the course of coverage provided according to the method disclosed herein when non-guaranteed insurance is not purchased.

DETAILED DESCRIPTION

Figure 1:
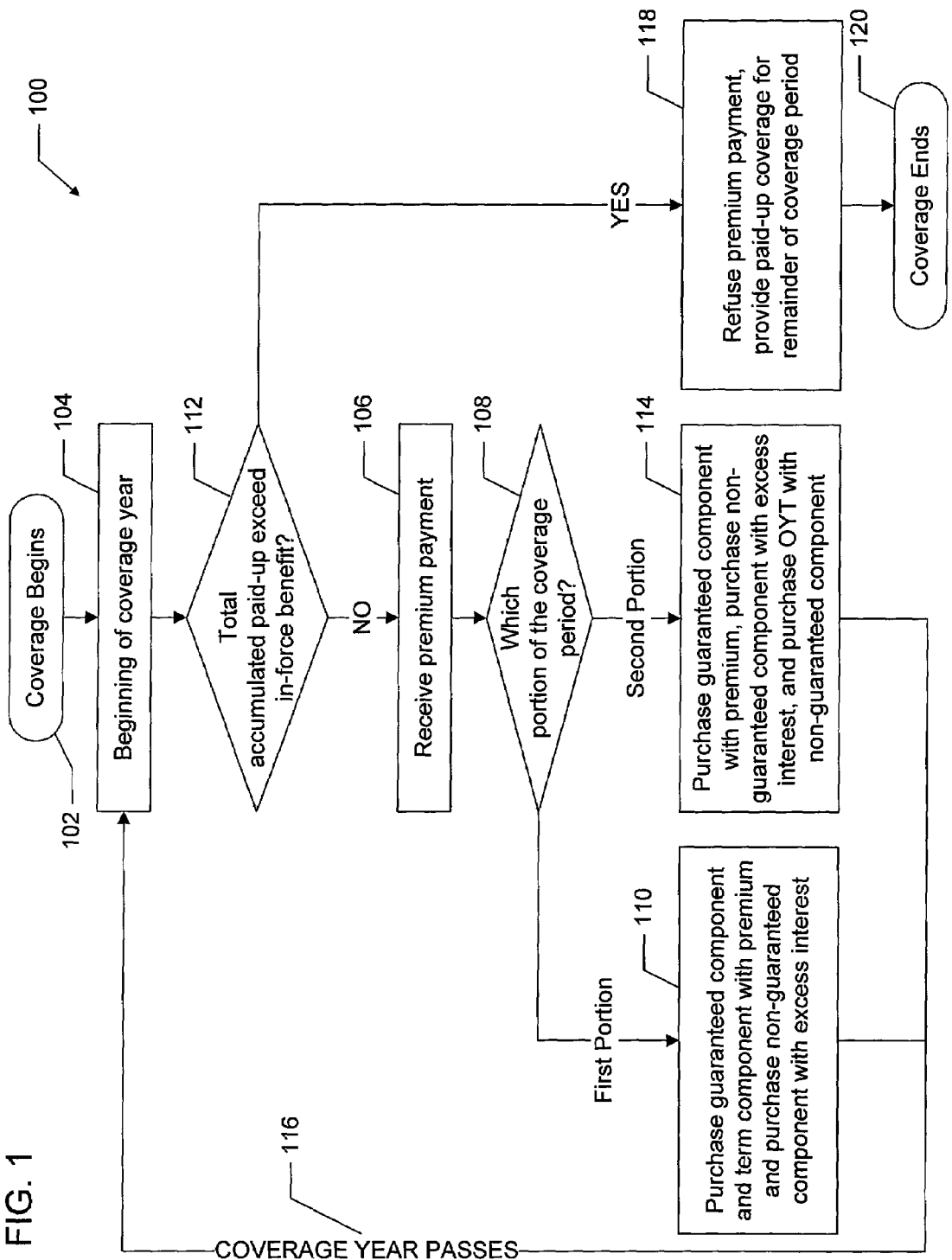
FIG. 1 is a flow chart of an example process for using one or more premium payments to purchase insurance according to the disclosed method.

Group life insurance can be generally classified as either permanent insurance or as term insurance. Permanent insurance typically provides a benefit to a beneficiary if an insured event occurs during a relatively long period of time—typically the life of the insured—so long as the owed premiums are paid for the permanent insurance policy. If, during the coverage period, the premiums owed for the policy are not paid, the insured loses the right to have the benefit disbursed upon the occurrence of the insured event.

At least some of each premium received by an insured in exchange for providing permanent insurance coverage may be invested to generate income. This invested portion helps the insurer accumulate assets from which to pay benefit amounts owing to beneficiaries of a number of policies, even if the sum of a particular individual's premiums does not exceed the in-force benefit of that individual's coverage when the insured event occurs. Guarantees may be made based on a set of assumptions such as mortality assumptions and/or interest rate assumptions. These guarantees may be made with varying degrees of risk—that is, the assumptions underlying the guarantees may be relatively conservative or relatively aggressive. It should be appreciated that the insurer may guarantee features of insurance coverage such as benefit amounts, premiums owed, and/or coverage period length.

Permanent insurance policies may accumulate paid-up benefits such that even if an insured (or other purchaser of insurance coverage) ceases paying premiums, a future occurrence of the insured event results in the paid-up benefit being disbursed to one or more beneficiaries. The paid-up benefit typically begins as substantially smaller than the overall benefit, and approaches the overall benefit as the insured ages.

Term insurance provides a term benefit if an insured event occurs during the relatively short term of the insurance. When an insured is younger (and typically, in better health) the benefit of term insurance coverage is typically larger than the benefit of permanent insurance purchased with the same premium. Term insurance does not accumulate a paid-up benefit. Therefore, if the insured event does not occur during the term of coverage, all premiums paid for the term of the insurance are exhausted for coverage. Moreover, if an individual ceases making premium payments or otherwise fails to secure subsequent term insurance for subsequent terms, no disbursement will be made upon the occurrence of an insured event regardless of past term insurance purchased and premiums paid.

The method of providing insurance disclosed herein includes purchasing one or more components of different kinds of insurance in varying ratios for each of a plurality of level premium payments received from an insured during the coverage period. The method may include purchasing one or more of a guaranteed insurance component, a non-guaranteed insurance component, and a term insurance component. The ratios in which the three components are purchased vary depending on the portion of an insurance coverage period for which a premium was paid.

The insurance coverage provided according to the disclosed method may be viewed as covering or spanning two time periods: a first portion of the coverage period and a second portion of the coverage period. During the first portion of the coverage period, coverage having a relatively high level in-force benefit is provided. This benefit may be guaranteed, such that the success of any investments made by the insurer using the premiums paid in exchange for coverage do not impact the in-force benefit provided to the insured. During the second portion of the coverage period, coverage with a reduced level in-force benefit may be provided. The level in-force benefit provided during the second portion of the coverage period may also be a guaranteed benefit, such that it is unaffected by the success of any investments made by the insurer.

The length of the first portion of the coverage period may be determined based on the passage of a number of years (e.g., 25 years from the payment of the first premium). The length of the first portion may alternatively be determined based on the insured's age (e.g., until the insured reaches age 70). The length of the first portion may further be determined by the later of the two above criteria (i.e., the later of 25 years of the coverage being in effect and the insured reaching the age of 70).

The length of the second portion of the coverage period may be determined based on an age of the insured. For example, the second portion of the coverage period may end when an insured attains the age of 121. It should be appreciated that by providing coverage until the insured reaches such a relatively high age, the method disclosed herein effectively provides coverage for the remainder of the life of the insured. The length of the second portion of the coverage period may also be determined based on the passage of a number of years, or by the later of a passage of a number of years and a designated age of the insured.

The method disclosed herein provides coverage that eventually becomes fully paid-up—that is, at some point during the coverage period, premium payments are no longer required, but the insured continues to receive coverage for the remainder of the coverage period. The coverage becomes paid-up when the sum of any accumulated paid-up insurance equals or exceeds the then-applicable in-force benefit (regardless of the amount of the in-force benefit, discussed below). The disclosed coverage may be guaranteed to become paid-up at a time during the second portion of the coverage period. The time may be determined by an age of the insured, a number of years, or the later of a number of years and an age of the insured. For example, coverage may be guaranteed to become paid-up when the insured reaches the age of 100 years.

It should be appreciated that coverage may become fully paid-up at any time, depending on the availability of interest generated by the guaranteed component usable to purchase non-guaranteed insurance having paid-up benefits. The examples discussed below relate to a method of providing insurance coverage which becomes paid-up at some point during the second portion of the coverage period (both guaranteed and based on current interest projections); however, it is within the contemplation of the instant disclosure that coverage may become fully paid-up sometime during the first coverage period based on the performance of various investments made by the insurer.

Generally, during the first portion of the coverage period, each premium payment is used to purchase guaranteed insurance having a paid-up benefit and term insurance having a non-paid-up term benefit. A substantially constant ratio of the premium payments may be used during the first portion of the coverage period to purchase term insurance and to purchase guaranteed insurance. The sum of the benefit from the term component and the accumulated paid-up benefit provide a relatively high, level in-force benefit. As premium payments are made during the first portion of the coverage period, the percentage of the in-force benefit attributable to the accumulated paid-up benefit increases, and the portion of the in-force benefit attributable to the term component decreases.

Despite the decreasing term benefit provided by each purchased term component, the percentage of each level premium required to purchase each term component remains substantially constant. For example, as an insured ages, term insurance becomes more expensive for the same amount of coverage. Therefore, providing the same percentage of the premium payment results in lower term benefit amounts for each subsequent term component purchased. The initial percentage split between the portion of the premium allocated to purchase paid-up insurance and the portion allocated to purchase term insurance may reflect this decreasing term benefit.

During the first portion of the coverage period, some of any interest generated from the investments made for the guaranteed component are used to purchase non-guaranteed insurance having a paid-up benefit. In various embodiments, the interest is generated based on receiving one or more mortality credits and/or one or more excess interest credits. These non-guaranteed components may be purchased based on less conservative assumptions than the assumptions underlying the purchase of the guaranteed insurance. Depending on the rate of return on the investments made for the non-guaranteed insurance, the sum of the guaranteed paid-up benefit and the non-guaranteed paid-up benefit may or may not exceed the in-force benefit during the first portion of the coverage period.

It should be appreciated that so-called non-guaranteed insurance is referred to as non-guaranteed due to the conditional nature of the purchase of the insurance. That is, under the disclosed method, it is not guaranteed whether, for a policy period (i.e., one year of coverage), the paid-up insurance previously purchased will generate excess interest. In situations in which no excess interest is generated, non-guaranteed insurance is not purchased. When excess interest is generated, however, non-guaranteed insurance is purchased. When purchased, the non-guaranteed insurance has a known, predetermined impact on coverage. That is, the non-guaranteed insurance increases the paid-up benefit by a predefined amount. Thus, as used herein, the term "non-guaranteed insurance" or "non-guaranteed component" refers to insurance wherein the purchase is not guaranteed, but wherein when purchased, the characteristics of the coverage are known at the time of purchase.

Any non-guaranteed paid-up insurance purchased may be purchased on an anniversary of the beginning of coverage as disclosed herein. The non-guaranteed insurance may be purchased using non-guaranteed credits based upon interest and mortality more favorable than the interest and mortality assumptions underlying the purchase of guaranteed insurance. The credits may each be calculated based on one or more of: a guaranteed mortality rate, a current mortality rate, a current interest rate, a guaranteed interest rate, and a net single premium rate. These rates may be determined on each anniversary of the beginning of the disclosed coverage, such that any non-guaranteed insurance is purchased based on credits received on an anniversary.

The disclosed coverage may result in one or more of a plurality of credits for each anniversary. For example, the disclosed coverage may create one or more of a mortality credit, a survivor credit, and an excess interest credit, which may be used to purchase non-guaranteed insurance. A mortality credit may be credited and used to purchase non-guaranteed insurance based on one or more of the guaranteed in-force benefit, the guaranteed mortality rate, the current mortality rate, the current interest rate, and the current mortality rate. A survivor credit may be credited and used to purchase non-guaranteed insurance based on one or more of the guaranteed paid-up benefit from the prior anniversary, the current mortality rate, and the current interest rate. The excess interest credit may be credited and used to purchase non-guaranteed insurance based on one or more of the guaranteed paid-up benefit from the prior anniversary, the non-guaranteed paid-up benefit from the prior anniversary, the current interest rate, the guaranteed interest rate, and the net single premium rate. It should be appreciated that various equations for calculating credits are contemplated by the instant disclosure. It should be further appreciated that for brevity, credits used to purchase non-guaranteed insurance, which may always be based, in part, on the current rate, will be referred to as interest generated by the accumulated guaranteed paid-up insurance.

The relatively conservative assumptions underlying the purchase of guaranteed insurance may reflect the insurer's obligation to purchase a requisite amount of guaranteed insurance. The assumptions underlying any non-guaranteed insurance purchased with some of any generated excess interest may be less conservative than the assumptions underlying the purchase of the guaranteed insurance. It should be appreciated that each purchased non-guaranteed insurance component provides a known paid-up benefit. It is referred to as non-guaranteed insurance because there is no guarantee that it will be purchased. That is, there is no guarantee that the guaranteed insurance will generate excess interest to enable the non-guaranteed insurance to be purchased.

When purchasing term insurance during the coverage period, the amount of the term benefit needed may be reduced by any paid-up benefit attributable to non-guaranteed insurance. The term benefit may be calculated by subtracting the sum of the guaranteed paid-up benefit and the non-guaranteed paid-up benefit from the in-force benefit. Thus, a non-zero non-guaranteed paid-up benefit reduces the amount of term benefit required to provide the in-force benefit.

During the second portion of the coverage period, wherein the guaranteed in-force benefit is reduced, each premium payment received may be used to purchase only guaranteed insurance having a paid-up benefit. If no paid-up benefit attributable to non-guaranteed insurance has accumulated during the first portion of the coverage period, or if the sum of any accumulated paid-up benefit attributable to the guaranteed insurance and any accumulated paid-up benefit attributable to the non-guaranteed insurance does not exceed the lower in-force benefit, any purchased term insurance only needs to provide a term benefit equal to the difference of the lower guaranteed in-force benefit and the accumulated paid-up benefit. However, if the total accumulated paid-up benefit accumulated during the second portion of the coverage period exceeds the lower guaranteed in-force benefit, some of any excess paid-up benefit is used to purchase One Year Term (OYT) insurance to provide a total benefit equivalent to the in-force benefit for the first portion of the coverage period. It should thus be appreciated that if sufficient paid-up benefit attributable to non-guaranteed insurance has been accumulated (and thus increases the guaranteed paid-up benefit), the in-force benefit provided is not reduced at the beginning of the second portion of the coverage period.

The OYT insurance may be purchased even if insufficient non-guaranteed paid-up insurance has accumulated to purchase enough OYT to increase the in-force benefit to the level of the in-force benefit during the first portion of the coverage period. In such a situation, the OYT may increase the in-force benefit above the lower in-force benefit guaranteed during the second portion of the coverage period but the in-force benefit may remain below the higher in-force benefit guaranteed during the first portion of the coverage period. OYT may be purchased based on at least one of the current mortality rate and the current interest rate, determined as of each anniversary of the coverage.

If, at any point during the coverage period disclosed, the total accumulated paid-up benefit exceeds the in-force benefit, the coverage becomes fully paid-up and no further premiums are required.

During the second portion of the coverage period, if the in-force benefit is the reduced, guaranteed in-force benefit (i.e., there is not sufficient accumulated paid-up insurance to purchase OYT), the coverage becomes fully paid-up when the accumulated paid-up benefit meets or exceeds the lower in-force benefit. In this instance, no further premiums are owed and the coverage is paid-up for the lower in-force benefit for the remainder of the coverage period. It should be appreciated that the insurer may provide coverage guaranteed to become fully paid-up when the insured reaches a given age, such as 100 years of age.

Alternatively, if the in-force benefit is the higher continuation of the in-force benefit from the first portion of the coverage period (i.e., if OYT is purchased with excess accumulated paid-up insurance), the coverage may become paid-up when the sum of the accumulated paid-up benefits exceeds the higher in-force benefit. The insured (or other purchaser of insurance coverage) is no longer obligated to make premium payments, and receives paid-up coverage at the higher in-force benefit for the remainder of the coverage period. It should be appreciated that the coverage may become fully paid-up based on purchased non-guaranteed insurance at any time during the coverage period depending on the amount of interest generated.

It should be appreciated that regardless of the in-force benefit at the time the coverage becomes fully paid-up, the paid-up benefit available after the coverage becomes fully paid-up may exceed the in-force benefit. For example, if the premium applied in the last year before the coverage becomes paid-up generates a paid-up benefit exceeding the in-force benefit, the total in-force benefit will represent the benefit for the remainder of the coverage period. Alternatively, the paid-up benefit may exceed the in-force benefit if the interest generated enables purchase of non-guaranteed insurance with a paid-up benefit exceeding the difference between the in-force benefit and the then-accumulated paid-up benefit.

Referring now to the figures, FIG. 1 illustrates an example flow chart of a process 100 for using a plurality of premium payments to insure an individual according to the method disclosed herein. Although the example process for insuring an individual 100 is described with reference to the flow chart illustrated in FIG. 1, it will be appreciated that many other methods of insuring an individual are contemplated. For example, the order of many of the blocks may be changed, and many of the blocks described are optional.

Upon execution of an insurance contract, an insurer begins providing coverage to the insured according to the disclosed method (block 102). In illustrated process 100, premiums are due annually, and the coverage period is determined based on designated numbers of coverage years. After coverage begins, the first coverage year begins (block 104). It should be appreciated that after a coverage year begins (block 104), each coverage year in the coverage period of the disclosed process 100 is treated identically for purposes of determining how a premium payment is to be used to purchase guaranteed, non-guaranteed, and term insurance components.

At the beginning of each coverage year (block 104), the insurer determines whether the current accumulated paid-up benefit exceeds the in-force benefit for that coverage year (block 112). For example, the sum of the guaranteed paid-up benefit and the non-guaranteed paid-up benefit may exceed the in-force benefit. Alternatively, the guaranteed paid-up benefit alone may exceed the in-force benefit.

If the accumulated paid-up benefit exceeds the in-force benefit for a coverage year (block 112), the coverage is fully paid-up and no premium payment is owed for that coverage year. Fully paid-up coverage may be provided for the remainder of the coverage period in an amount equal to or exceeding the in-force benefit (block 118). No further premium payments are due for this fully paid-up coverage (block 118). The coverage may thus remain in effect until the insured reaches a predefined age, such as 121 years of age. If an insured event occurs prior to the expiration of the coverage period (i.e., the insured dies), the paid-up benefit is provided to a designated beneficiary. If, however, the insured event does not occur before the expiration of the coverage period (i.e., the insured lives past the age of 121), coverage ends (block 120) without the insurer disbursing any benefit. Regardless, after the coverage has become paid-up, the insured (or other purchaser of insurance coverage) does not owe additional premium payments for the duration of the coverage period (block 118).

If the sum of the accumulated guaranteed paid-up benefit and the accumulated non-guaranteed paid-up benefit does not exceed the in-force benefit for the coverage year (block 112), the coverage is not paid-up and the insured (or other purchaser of insurance coverage) is contractually obligated to remit a premium payment (assuming the purchaser wishes coverage to continue). If the coverage is not fully paid-up, a premium payment for the upcoming coverage year is received (block 106) and is used to purchase various components of insurance coverage to provide the in-force benefit.

After receiving a premium payment, the insurer may determine how to allocate various percentages of the premium payment based on whether the coverage is in the first portion of the coverage period or the second portion of the coverage period (block 108). If the current coverage year is in the first portion of the coverage period, the received premium payment is split into two portions and used to purchase term insurance and guaranteed paid-up insurance (block 110). The ratio of each premium payment used to purchase term insurance and guaranteed paid-up insurance during the first portion of the coverage period may be constant or substantially constant throughout the first portion of the coverage period. It should be appreciated that for each received premium payment, the sum of any then-accumulated paid-up benefit and the term benefit of the currently purchased term component is equal to the in-force benefit. Some of any interest generated from previously purchased guaranteed insurance may be used to purchase additional insurance in the form of non-guaranteed paid-up insurance (block 110). If any non-guaranteed paid-up insurance is purchased, the non-guaranteed component increases the overall paid-up benefit available to the insured. After purchasing appropriate amounts of guaranteed, non-guaranteed, and term insurance for the coverage year of the first portion of the coverage period (block 110), the remainder of the coverage year passes, as indicated by numeral 116, with the insured receiving coverage having the appropriate in-force benefit (block 104).

It should be appreciated that, depending on the coverage year, excess interest may not have been generated. For example, for the first purchase of guaranteed insurance with the first premium payment, (i.e., during the first year of the coverage period), no interest will have been generated. If this is the case, no non-guaranteed paid-up insurance is purchased for that year.

After receiving a premium payment for a coverage year (block 106), the insurer may alternatively determine that the coverage year is in the second portion of the coverage period (block 108). For each coverage year of the second portion of the coverage period, it is determined whether the sum of any paid-up benefits accumulated over the course of the coverage exceeds the in-force benefit (block 114). As noted above, the in-force benefit during the second portion of the coverage period may be one of two values. First, the in-force benefit may be a reduced, guaranteed in-force benefit based on the purchase of only guaranteed paid-up insurance (e.g., if the accumulated paid-up benefit from the guaranteed and non-guaranteed components does not exceed the reduced guaranteed benefit amount and therefore cannot be used to purchase OYT insurance). Second, the in-force benefit for the second portion of the coverage period may be equal to the in-force benefit for the first portion of the coverage period (e.g., if the accumulated paid-up benefit exceeds the reduced guaranteed benefit amount and a portion of the non-guaranteed paid-up benefit may be used to purchase OYT insurance).

During the second portion of the coverage period, the premium payment received from the insured (block 106) may be used to purchase guaranteed insurance, term insurance, and non-guaranteed insurance (block 114). More specifically, a portion of the premium payment may be used to purchase guaranteed insurance, a portion of the excess interest from existing guaranteed insurance may be used to purchase non-guaranteed insurance, and a portion of the value of any existing non-guaranteed insurance may be used to purchase term insurance (block 114). After purchasing such insurance, the remainder of the coverage year passes, as indicated by numeral 116, until the beginning of the next coverage year (block 104).

It should be appreciated that premium payments may be due at different intervals than the one year interval 116 illustrated in FIG. 1. For example, coverage may be determined based on periods of months or other appropriate time intervals. It should be further appreciated that premium payments may be owed by an insured, a purchaser of insurance on behalf of an insured (i.e., a husband purchasing insurance for his wife), or some other third party. It should thus be appreciated that as used herein, references to premiums owed or insurance purchased by the insured may refer to premiums owed or insurance purchased by the insured or a third party on behalf of the insured.

Depending on the accumulated paid-up benefit at the time an insured event occurs, varying disbursements are made to a beneficiary designated by the insured. For example, if the insured dies during the coverage period, the in-force benefit, the paid-up benefit, or no benefit may be disbursed to a beneficiary depending on the premium payments received, the non-guaranteed insurance purchased, and the policy year.

Generally, the amount disbursed to a beneficiary upon the occurrence of an insured event depends on whether the insured (or a party acting on behalf of the insured) has been diligent in making premium payments. If the insured (or other purchaser of insurance coverage) has paid all premium payments owed, the beneficiary will receive disbursement of the in-force benefit at the time the insured event occurred. If the insured (or other purchaser of insurance coverage) missed one or more premium payments, the beneficiary will generally receive a disbursement equal to the amount of the accumulated paid-up value of the coverage at the time a premium was owed but not paid. If, at any point during the coverage period, the paid-up benefit exceeds the in-force benefit then-applicable, the beneficiary will receive the greater of the paid-up benefit and the in-force benefit upon the occurrence of the insured event.

The disclosed method includes a paid-up non-eligibility period at the beginning of the coverage period. During this period, an insured is not entitled to any accumulated paid-up benefit. Even though paid-up benefits are accumulating, if the insured (or other purchaser of insurance coverage) ceases making premium payments during the paid-up non-eligibility period and an insured event thereafter occurs, the beneficiary will not receive a disbursement. If the insured (or other purchaser of insurance coverage) continues to make the required premium payments during the paid-up non-eligibility period, ceases making premium payments after the expiration of the paid-up non-eligibility period, and thereafter an insured event occurs, the beneficiary receives a disbursement equal to any accumulated paid-up benefit. It should be appreciated that any paid-up benefit attributable to non-guaranteed insurance may also be subject to forfeiture if the insured does not remit the required premium payments during the paid-up non-eligibility period.

Figure 2:
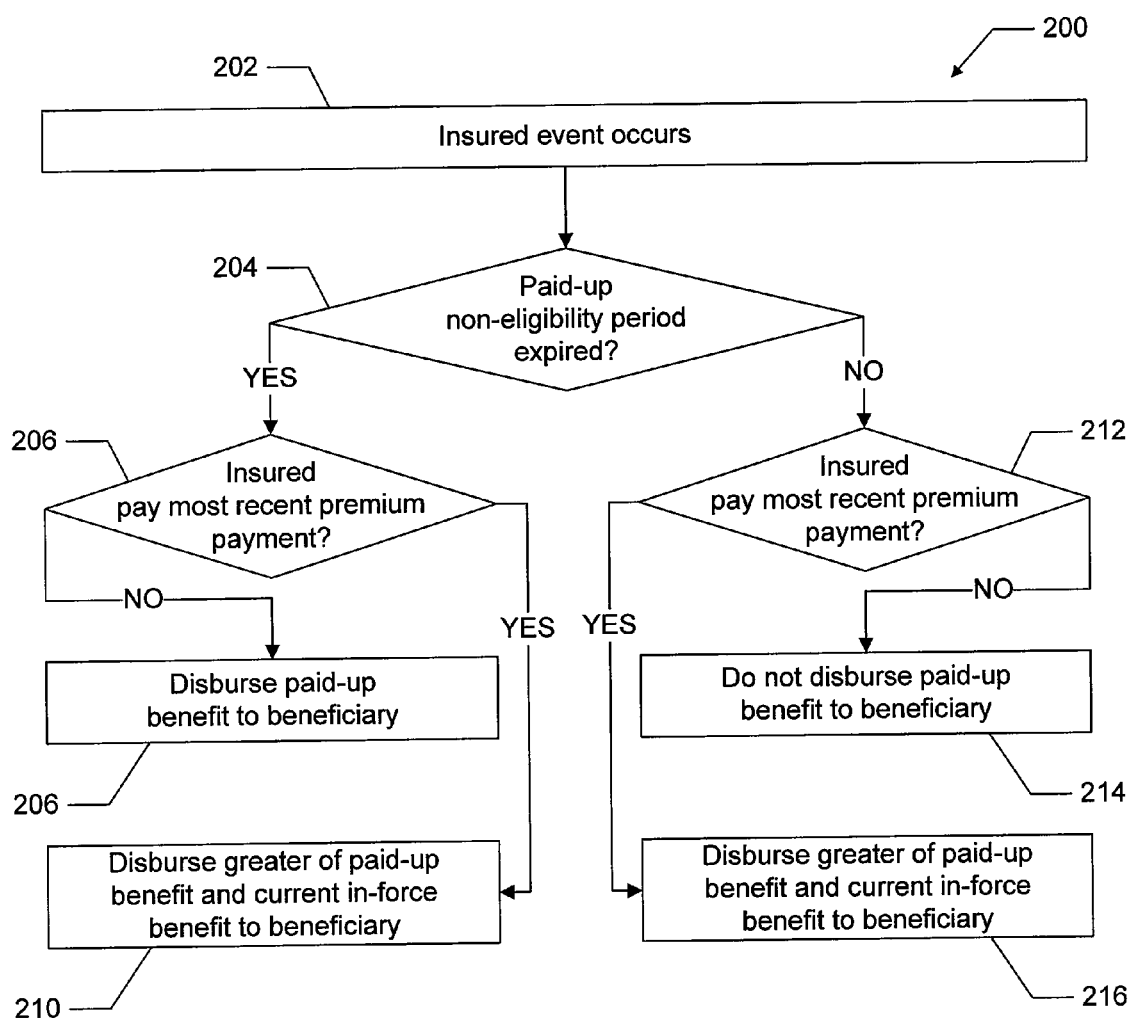
FIG. 2 is a flow chart of an example process for determining a benefit amount to disburse to a beneficiary upon an occurrence of an insured event.

FIG. 2 illustrates a flow chart of an example process 200 for determining a benefit amount (if any) owed to a beneficiary upon the occurrence of an insured event. Although the example process 200 for determining a benefit amount owed to a beneficiary upon the occurrence of an insured event is described with reference to the flow chart illustrated in FIG. 2, it will be appreciated that many other methods of insuring an individual are contemplated. For example, the order of many of the blocks may be changed, and many of the blocks described are optional.

As illustrated in FIG. 2, process 200 begins with the occurrence of an insured event (block 202). For the insured event, the determination of a benefit amount (if any) to disburse begins by determining whether the insured paid all premiums due for the paid-up non-eligibility period (block 204).

If the insured (or other purchaser of insurance coverage) did pay all the premiums owed for the paid-up non-eligibility period (i.e., the designated beneficiary is eligible to receive at least the paid-up benefit), it is next determined whether the insured paid the most recently due premium (block 206). If the insured (or other purchaser of insurance coverage) did not pay the most recently due premium (block 206), the then-accumulated paid-up benefit is paid to the beneficiary (block 208). If the insured (or other purchaser of insurance coverage) did pay the most recently due premium (block 206), the greater of the then-accumulated paid-up benefit and the in-force benefit is paid to the beneficiary (block 210). It should be appreciated that if the accumulated paid-up benefit exceeds the in-force benefit, the coverage becomes fully paid-up for the larger of the two amounts. The insured may receive the benefit of this situation, and the paid-up benefit may be disbursed to the beneficiary upon the occurrence of an insured event.

If the insured (or other purchaser of insurance coverage) did not pay all the premiums for the paid-up non-eligibility period, (i.e., the insured missed a premium or the paid-up non-eligibility period has not yet expired), it is next determined whether the insured paid the most recently due premium (block 212). If the insured did not make the most recently due premium payment (block 212), no benefit is paid to the beneficiary (block 214), because the insured is not eligible to receive either the in-force benefit or the paid-up benefit. However, if the insured (or other purchaser of insurance coverage) did make the most recently due premium payment (block 212), the greater of the paid-up benefit and the current in-force benefit is paid to the beneficiary (block 216). The in-force benefit may be the higher in-force benefit facilitated by the purchase of additional OYT insurance with a portion of any accumulated non-guaranteed paid-up insurance, or may be the lower, guaranteed in-force benefit based on the purchase of only guaranteed insurance.

Figure 5:
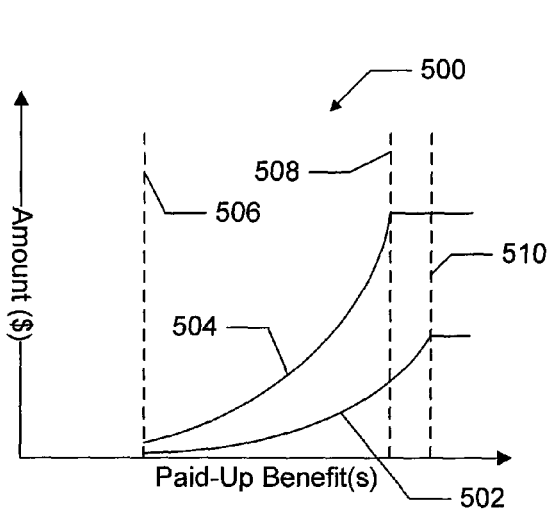
FIG. 5 is a graph displaying an example of the paid-up benefits available to a beneficiary upon an occurrence of an insured event for insurance coverage provided according to the method disclosed herein.
Figure 6:
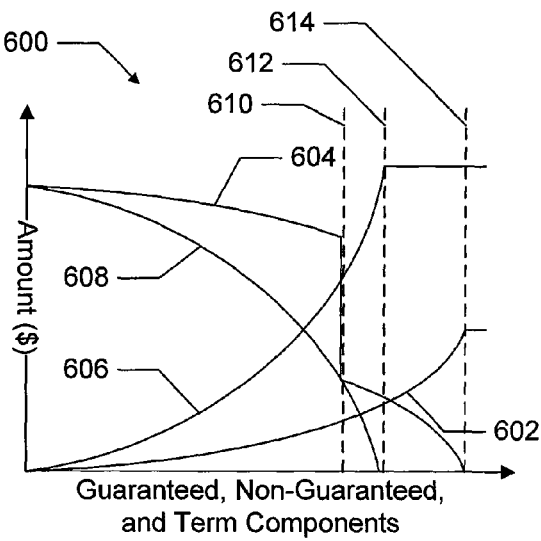
FIG. 6 is a graph displaying an example of the value over time of a guaranteed component, a non-guaranteed component, and a term component of insurance coverage provided according to the method disclosed herein.
Figure 7B:
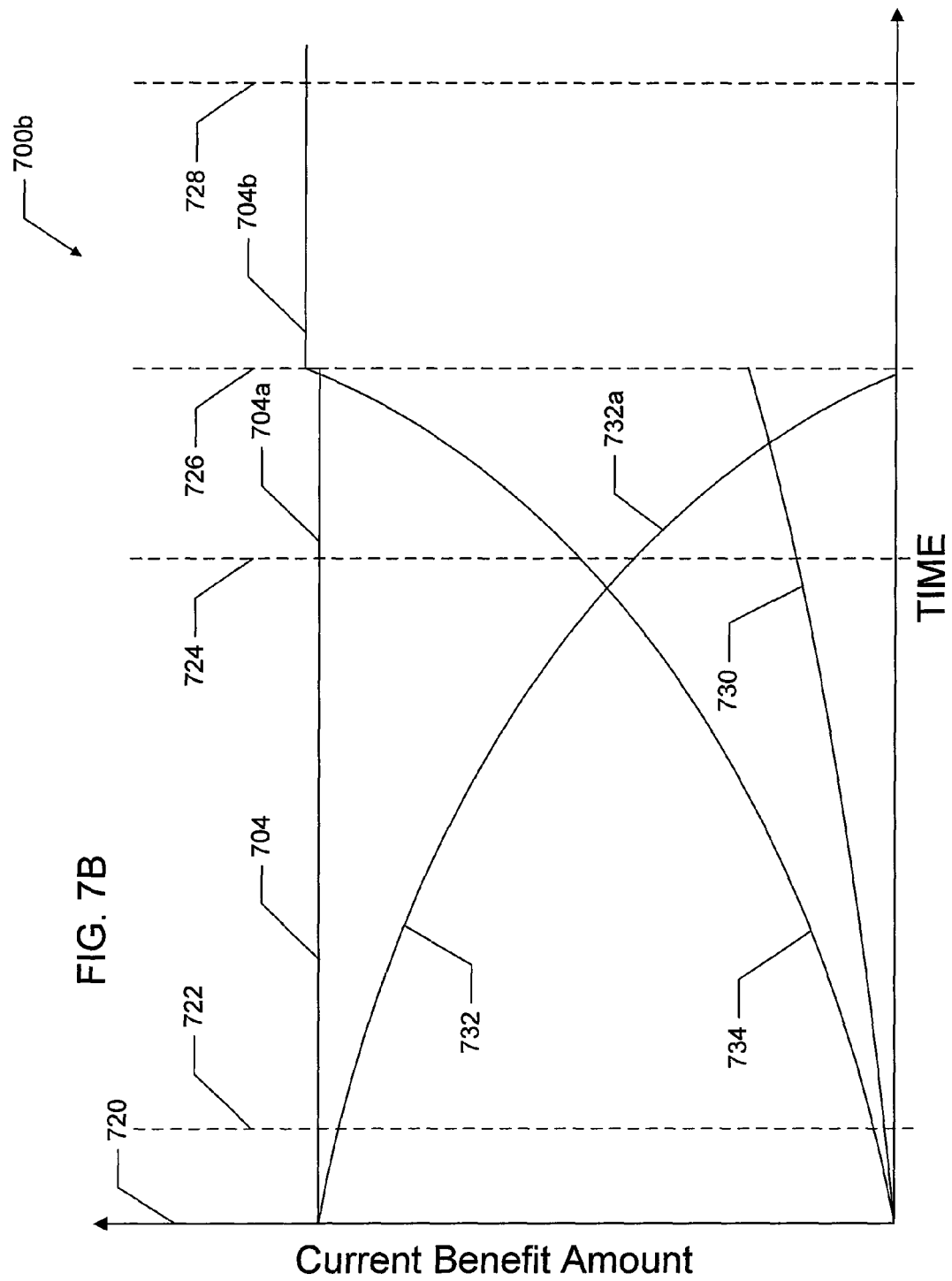
FIG. 7B is an enlarged, to-scale graph displaying an example of paid-up and in-force benefits available over the course of coverage provided according to the method disclosed herein when non-guaranteed insurance is purchased according to current market conditions, the non-guaranteed insurance increasing the accumulated paid-up benefit.

Referring now to FIGS. 3, 4, 5, 6, 7A, and 7B, example graphs are illustrated indicating a plurality of characteristics of example implementations of the disclosed method of insuring a group of individuals represented by a dollar amount over the duration of coverage. It should be appreciated that FIGS. 3 to 6 are not drawn to scale, and thus merely illustrate the relative timing of various events in the course of insuring an individual as disclosed herein. FIGS. 7A and 7B are drawn to scale and illustrate the relative lengths of the various periods of time of the method disclosed herein over the course of a 65 year insurance coverage period beginning when an insured individual is 35 years of age and ending when the individual exceeds 100 years of age.

It should be further appreciated that any curved lines of the graphs of FIGS. 3 to 6, 7A, or 7B may be straight lines in various embodiments. The lines represent the growth or decline of various amounts of benefits and payments, and as such the rate of such growth or decline may vary depending on specifics regarding the insurer, the insured, and/or other economic and mortality factors.

Figure 3:
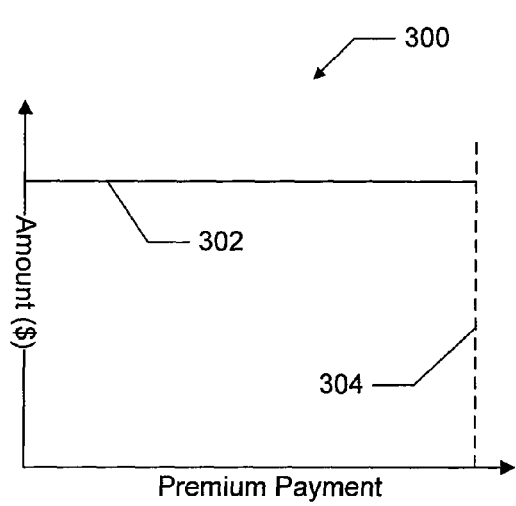
FIG. 3 is a graph displaying an example of the level premium payments due over the course of insurance coverage provided according to the method disclosed herein.

FIG. 3 illustrates a graph 300 of an example representation of the amount of premium payments owed over time according to the method disclosed herein. It should be appreciated that line 302 indicates that level premiums are owed to receive a level in-force benefit until the point in time indicated by line 304. The time indicated by line 304 is a time at which the accumulated paid-up benefit equals or exceeds the in-force benefit. When this occurs, the coverage becomes fully paid-up and no further premiums are owed. It should be appreciated that the in-force value applicable at the time indicated by line 304 varies depending on whether the paid-up benefit exceeded the lower in-force value at the beginning of the second portion of the coverage period. The time indicated by line 304 may vary even for coverage of a single individual. For example, the time indicated may be the time the individual reaches 100 years of age (e.g., the guaranteed paid-up date) or may be a time during the first or second portions of the coverage period (e.g., the date at which the sum of any guaranteed and non-guaranteed paid-up insurance exceeds the in-force benefit).

Figure 4:
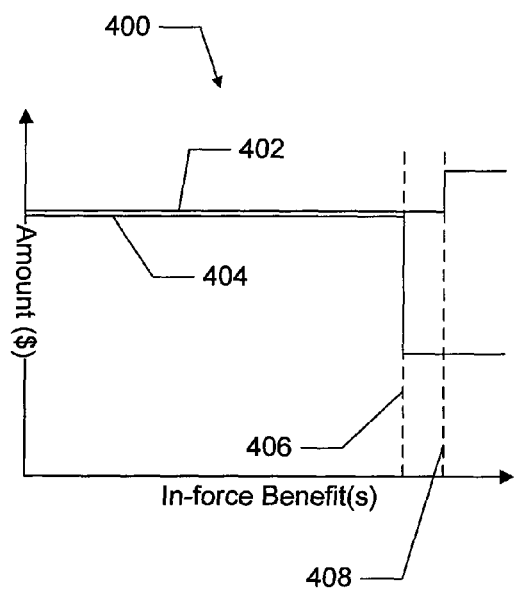
FIG. 4 is a graph displaying an example of the total in-force benefits available to a beneficiary upon an occurrence of an insured event over the course of insurance coverage provided according to the method disclosed herein.

FIG. 4 illustrates an example graph 400 of the in-force benefit available to a beneficiary designated by an insured wherein the insured (or other purchaser of insurance coverage) pays all owed premiums over the coverage period. As illustrated, line 402 indicates an in-force benefit resulting from the regular purchase of non-guaranteed paid-up insurance. Line 404 indicates a guaranteed in-force benefit available over the course of the insurance disclosed herein regardless of the purchase of any non-guaranteed paid-up coverage. It should be appreciated that graph 400 is not drawn to scale; hence, the relative behavior of lines 400 and 402 is primarily illustrative.

As illustrated, the initial in-force benefit is identical for lines 402 and 404. It should be appreciated that until the time indicated by line 406, the in-force benefit is guaranteed and is provided based on a combination of paid-up insurance and term insurance purchased using each received premium payment. The amount of term insurance may vary depending on the total accumulated paid-up insurance. After the time indicated by line 406, the in-force benefit provided on a guaranteed basis 404 decreases. The time indicated by line 406 illustrates the end of the first portion of the coverage period and the beginning of the second portion of the coverage period.

Line 402, indicating the projected non-guaranteed in-force benefit, remains constant beyond the change from the first portion to the second portion of the coverage period indicated by line 406. This is because a portion of the accumulated paid-up benefit attributable to the non-guaranteed component is used to purchase one year term (OYT) insurance to provide any additional benefit necessary to maintain the relatively higher in-force benefit from the first portion of the coverage period. Further, the in-force benefit represented by line 402 increases at the time indicated by line 408 because the sum of the guaranteed paid-up benefit and the non-guaranteed paid-up benefit exceeds the in-force benefit at time 408. At this point, the coverage becomes fully paid-up at a value above the initial in-force benefit, and no further premiums are owed.

FIG. 5 illustrates an example graph 500 indicating the guaranteed and non-guaranteed paid-up benefit available over time if an individual ceases making premium payments prior to coverage becoming fully paid-up. As illustrated, line 502 indicates an example guaranteed paid-up benefit and line 504 indicates an example sum of the guaranteed and the non-guaranteed paid-up benefits. The time indicated by line 506 represents the expiration of the paid-up non-eligibility period. As illustrated, no paid-up benefit is available to an insured if the party obligated to make premium payments ceases making premium payments prior to the time indicated by line 506. The estimated sum of all accumulated paid-up benefits, illustrated by line 504, begins at a higher value and increases at a higher rate than the guaranteed paid-up amount, illustrated by line 502. It should be appreciated that illustrated line 504 represents coverage wherein excess interest is available for each coverage year to enable the purchase of non-guaranteed paid-up insurance.

As further illustrated, the sum of the guaranteed and non-guaranteed paid-up components 504 becomes a horizontal line after the time indicated by line 508. This is because in the illustrated example, the time indicated by line 508 represents the time at which the sum of the paid-up benefit of the non-guaranteed component and the paid-up benefit of the guaranteed component exceeds the in-force benefit resulting from the purchase of OYT with the accumulated non-guaranteed paid-up insurance.

The line 502 representing the guaranteed paid-up benefit becomes a horizontal line after the time indicated by line 510. This is because at time 510, the guaranteed paid-up benefit equals or exceeds the guaranteed in-force benefit, which may have been reduced because insufficient non-guaranteed paid-up insurance had been purchased to increase the total paid-up benefit to above the reduced in-force benefit. The time indicated by line 510 may be calculated prior to the beginning of coverage such that the line 510 is a fixed, guaranteed point in time (i.e., the time when the insured reaches 100 years of age).

It should be appreciated that any paid-up benefit available to an insured when the purchaser of insurance coverage ceases making premium payments is determined by the paid-up benefit accumulated as of the year the last required premium payment was made. Thus, if an insured (or other purchaser of insurance coverage) ceases making payments prior to the time indicated by line 506 and the insured subsequently dies after the time indicated by line 506, the paid-up benefit available is indicated by the graph 500 at the time prior to line 506 (i.e., the beneficiary receives no benefit).

FIG. 6 illustrates an example graph 600 showing the ratios of the guaranteed, non-guaranteed, and term components for the method disclosed herein. It should be appreciated that FIG. 6 is not drawn to scale, so the graph 600 illustrates merely the relationships between the various insurance components disclosed herein.

Line 602 of graph 600 indicates the value of the guaranteed paid-up benefit over the course of the coverage period. As indicated, line 602 begins at zero and increases throughout the coverage period. This is because as guaranteed insurance is purchased with each additional premium payment received, the paid-up benefit attributable to the guaranteed insurance increases as well. Moreover, as compared with line 502 of graph 500, line 602 begins at the origin of graph 600. It should be appreciated that line 602 indicates the value of the guaranteed insurance accumulated, whereas line 502 represents the amount of the paid-up benefit available to the insured if the insured (or other purchaser of insurance coverage) ceases making premium payments. Thus, the guaranteed component accumulates value even during the paid-up non-eligibility period, but if an insured (or other purchaser of insurance coverage) ceases making payments during this period, the paid-up benefit will not be paid to the insured's beneficiary upon an occurrence of the insured event.

Line 604 of graph 600 illustrates the term benefit provided throughout the coverage period if the accumulated paid-up benefit does not exceed the guaranteed paid-up benefit. As illustrated, the term benefit decreases as the guaranteed benefit increases, such that the sum of the two components forms the level in-force benefit. It should be appreciated that at the time illustrated by line 610, the guaranteed in-force benefit drops from a relatively high benefit amount to a relatively lower benefit amount. In this case, the amount of term insurance, represented by line 604, required to provide the in-force benefit is reduced as well. Moreover, as illustrated, line 602 becomes horizontal after the time illustrated by line 614, indicating that the coverage becomes fully paid-up with a paid-up benefit equal to the lower in-force benefit. In this embodiment, no more guaranteed or term insurance is purchased, so the paid-up amount remains constant. Thus, line 604 reaches zero at the time indicated by the vertical line 614.

Line 606 of graph 600 illustrates the sum of the guaranteed and non-guaranteed paid-up benefits in one embodiment of the method disclosed herein. As illustrated, the sum of the two paid-up benefits increases at a higher rate than the guaranteed paid-up benefit, illustrated by line 602. As further illustrated, after the time indicated by line 610, a portion of the paid-up benefit is used to purchase OYT insurance to maintain an in-force benefit equal to the in-force benefit of the first portion of the coverage period (i.e., prior to the time indicated by line 610). Moreover, after the time illustrated by line 612, the sum of the paid-up benefit attributable to the guaranteed and the non-guaranteed components exceeds the initial in-force benefit. Thus, the coverage becomes fully paid-up at the relatively higher value. No additional paid-up coverage is purchased, and the insured (or other purchaser of insurance coverage) ceases making premium payments.

Line 608 illustrates the term benefit provided by term insurance purchased if the accumulated paid-up value is the value illustrated by line 606. As illustrated, because the paid-up benefit indicated by line 606 increases more quickly than the paid-up benefit illustrated by line 602, the amount of the term benefit needed decreases more quickly than the amount of the term benefit needed based only on the non-guaranteed benefit, illustrated by line 602.

Referring now to FIGS. 7A and 7B, graphs 700a and 700b illustrate the in-force benefit and the benefit amounts contributed to the in-force benefit by each of the insurance components over the course of an entire coverage period. It should be appreciated that graphs 700a and 700b are drawn to scale to illustrate example coverage provided without purchasing any non-guaranteed insurance, and example coverage provided including regularly purchasing non-guaranteed insurance, respectively, according to the method disclosed herein.

FIG. 7A illustrates the in-force benefit 702 resulting from insurance provided according to the method disclosed herein when non-guaranteed insurance is not purchased. Put another way, FIG. 7A illustrates the guaranteed benefit amount throughout the coverage period. The in-force benefit 702 begins at a relatively high amount at the beginning of the coverage period, illustrated by line 720. The in-force benefit remains level through the entire first portion of the coverage period. The first portion of the coverage period ends at the time indicated by the line 724. At that time, the second portion of the coverage period begins, and the guaranteed in-force benefit drops as indicated by line segment 702a. It should be appreciated that as illustrated, the amount by which the in-force benefit decreases is substantial; as illustrated, the line segment 702a represents a benefit amount that is 50% of the benefit amount of the initial level in-force benefit. For example, at the time indicated by line 724, the in force benefit may be reduced from $100,000.00 to $50,000.00. As further illustrated, the in-force benefit 702a remains constant at the lower benefit amount until the end of the coverage period.

FIG. 7A further illustrates the insurance components contributing to the guaranteed in-force benefit. These components include a guaranteed paid-up benefit 730 and a decreasing term benefit 732. At the beginning of the coverage period, indicated by line 720, the term benefit accounts for substantially all of the in-force benefit. As the first portion of the coverage period progresses, the amount of the in-force benefit provided by the term component 732 decreases, and the amount of the in-force benefit provided by the accumulated guaranteed paid-up component 730 increases.

At the end of the first portion of the coverage period, indicated by line 724, the in-force benefit drops to a lower guaranteed in-force benefit 702a. As illustrated, the paid-up benefit is not yet equal to the in-force benefit at the time indicated by line 724. Thus, term insurance must still be purchased to provide even the lower in-force benefit. However, the term benefit provided by the term component is substantially reduced, as illustrated by segment 732a. It should be appreciated that the sum of the term benefit and the paid-up benefit is still equivalent to the in-force benefit 702a during the second portion of the coverage period.

At the time indicated by line 728, the guaranteed paid-up benefit becomes equal to the in-force benefit. Beyond the time indicated by line 728, all of the in-force benefit is provided by the paid-up benefit, so no term insurance is needed. Moreover, the coverage beyond the time indicated by line 728 is fully paid-up, so no further guaranteed insurance is needed. Since no further insurance coverage is purchased, the insured (or other purchaser of insurance coverage) ceases making premium payments and receives fully paid-up coverage with a benefit amount indicated by line segment 702b/730a.

Referring now to FIG. 7B, the in-force benefit 704 is illustrated for the duration of a coverage period wherein non-guaranteed paid-up insurance is regularly purchased throughout the coverage period, thus increasing the accumulated paid-up benefit. FIG. 7B illustrates projected benefit amounts throughout the course of a coverage period based on current projections. As illustrated, the in-force benefit 704 is the same as the in-force benefit 702 of FIG. 7A during the first portion of the coverage period, indicated by the time between lines 720 and 724. The in-force benefit remains constant for the beginning of the second portion of the coverage period, indicated by line segment 704a. At the time indicated by line 726, the in-force benefit increases slightly, as indicated by line segment 704b. It should be appreciated that the amount of increase from line segment 704a to 704b may vary, and may even be zero (i.e., line segments 704, 704a, and 704b form a substantially continuous line).

FIG. 7B also illustrates the insurance components that, when combined according to the disclosed method, provide the in-force benefit indicated by line 704. These components include a guaranteed paid-up component 730, a term component 732, and a non-guaranteed paid-up component (not shown). It should be appreciated that as illustrated, the line 734 is a function of the non-guaranteed paid-up component— that is, line 734 indicates the sum of a non-guaranteed paid-up component and the guaranteed paid-up component indicated by line 730.

The guaranteed paid-up component 730 initially provides a paid-up benefit substantially equal to zero, and the decreasing term component 732 provides a term benefit substantially equal to the in-force benefit 704 of the coverage. As further illustrated, however, the sum of non-guaranteed paid-up benefit and the guaranteed paid-up benefit 734 increases more rapidly than the guaranteed paid-up benefit. Because with each additional unit of non-guaranteed insurance purchased the total paid-up benefit increases, the term component 732 does not need to remain as high as it did in FIG. 7A to maintain a level in-force benefit 704. Thus, as illustrated, line 732 decreases more rapidly than it did in FIG. 7A. The sum of the benefit indicated by line 732 and line 734 at a given point in time represents the total in-force benefit, illustrated by line 704. As the sum of the non-guaranteed paid-up benefit and the guaranteed paid-up benefit 734 grows, the term benefit decreases 732, such that the sum of the guaranteed paid-up benefit and the term benefit remains constant and is equal to the in-force benefit 704.

Unlike line 702 of FIG. 7A, line 704 of FIG. 7B remains constant before and after the time indicated by line 724. After the time indicated by line 724, the entirety of each premium payment is used to purchase guaranteed paid-up insurance. A portion of any accumulated non-guaranteed paid-up insurance value is used to purchase OYT insurance. Any interest generated by the guaranteed insurance is used to purchase non-guaranteed insurance. The disclosed method thus ensures that the sum of the non-guaranteed paid-up benefit, the guaranteed paid-up benefit, and the OYT benefit is equal to the in-force value 704a.

At the time indicated by line 726, the sum of the non-guaranteed paid-up benefit and the guaranteed paid-up benefit 734 exceeds the in-force benefit 704a. Thus, no additional term benefit is needed to provide the in-force benefit, as indicated by line 732a. Moreover, since the paid-up benefit exceeds the in-force benefit, the coverage is fully paid-up. The insured (or other purchaser of insurance coverage) no longer remits premium payments, but continues to receive coverage having a paid-up benefit as indicated by segment 704b until the end of the coverage period.

FIG. 7A illustrates an example of the disclosed method for providing insurance wherein no non-guaranteed insurance is purchased, so no non-guaranteed paid-up benefit accumulates. FIG. 7B illustrates an example of the disclosed method wherein non-guaranteed insurance is purchased with each premium payment, such that the sum of the accumulated non-guaranteed paid-up benefit and the accumulated guaranteed paid-up benefit increases continuously. The method disclosed herein may also result in the occasional purchase of non-guaranteed paid-up insurance. For example, for one or more coverage years, the guaranteed paid-up component may not generate excess interest. In these coverage years, no non-guaranteed paid-up insurance may be purchased. Regardless of the frequency with which such non-guaranteed paid-up insurance is purchased, the term insurance is still purchased as necessary to provide an in-force benefit. Moreover, if the sum of non-guaranteed paid-up benefit and the guaranteed paid-up benefit ever exceeds the then-in-force benefit, the coverage becomes fully paid-up and no further premiums are owed.

The lines indicative of various relevant times as illustrated in FIGS. 7A and 7B may be determined either based on an age of the insured, based on a number of years for which the coverage has been in effect, or based on a predefined number of years. For example, line 722 may represent a time five years after the initiation of coverage, indicated by line 720. Line 724 may represent the later of the time an insured reaches the age of 70 or 25 years after the initiation of coverage 720. Line 726 may not be predefined, as line 726 may be determined based on the accumulation of any non-guaranteed paid-up benefit. Line 728 may be set at the time the insured reaches the age of 100. These values may be modified depending on desired premium payments, desired in-force benefits, assumptions underlying the purchase of guaranteed insurance, cost of term insurance, the health of the insured and/or any other relevant factor.

In addition to the in-force and paid-up benefits described above, the disclosed method for providing insurance includes additional functionality to increase the value of the coverage provided to an insured or to provide a portion of any in-force or accumulated paid-up benefit to an insured prior to the occurrence of an insured event. It should be appreciated that various combinations of the additional functionalities described below may be applied to the disclosed method to achieve different results and to provide different coverage features and benefit amounts.

The method disclosed herein may additionally include providing a portion of the accumulated paid-up benefit or a portion of the in-force benefit prior to the occurrence of an insured event based on the health of the insured. For example, the method disclosed may include determining whether an insured is disabled. Disability may be judged based on an insured's ability to perform the insured's occupation in the usual and customary way. Alternatively, disability may be judged based on the insured's ability to perform any occupation, a predefined minimum occupation, or some other benchmark level of performance. Disability may be due to a bodily injury, a disease, a mental condition, a genetic condition, or some other condition.

If an individual is determined to be disabled, the method disclosed herein may continue providing the same in-force and paid-up benefits available as discussed above. In addition to providing the same in-force and paid-up benefits, some or all of any premiums due from the insured may be waived. Moreover, if premiums were paid after the insured became disabled, these premiums may be returned to the individual. This feature may further include rescinding the waiver of premiums if the insured ceases being disabled (i.e., the insured can return to work at the same job or at a different job) in the future.

The method disclosed herein may also provide some of any benefit that would be disbursed to one or more beneficiaries upon the occurrence of an insured event to the insured individual prior to an occurrence of the insured event. For example, if an insured incurs long term care expenses, some of those expenses may be provided from the benefit available under the disclosed coverage. The coverage disclosed herein may also assess the health or wellbeing of an insured prior to determining whether to provide a portion of the benefit prior to the insured event. For example, if an insured is unable to perform activities of daily living, the method disclosed may provide a portion of an in-force benefit or a paid-up benefit accumulated under the disclosed coverage to the insured, despite an insured event not occurring. Activities of daily living may include bathing, continence (i.e., the ability to maintain control of bowel and bladder function or the ability to care for the apparatus necessary to maintain control of bowel and bladder function), dressing, eating, toileting (i.e., the ability to get to and from the toilet and to perform the associated hygiene), and ambulation (i.e., the ability to move from a bed to a chair or wheelchair). The ability to perform activities of daily living may be determined by analyzing the number of the above functions an insured is unable to perform, such as two of the above functions. Alternatively, an insured's inability to perform one or more of the above activities may make the insured eligible to receive a portion of a benefit prior to an insured event.

If the insured is unable to perform one or more of the above functions, the disclosed coverage may advance a portion of the benefit to which the insured is entitled. Moreover, the disclosed coverage may repeatedly advance portions of the benefit at regular or irregular intervals, such as monthly, yearly, or as needed by the insured. The disclosed coverage may be further configured to advance a portion of the benefit if an insured is unable to care for the insured's own safety, wellbeing, health, and/or financial matters.

Another way in which the method disclosed herein advances some of a coverage benefit is by advancing a lump-sum to a terminally ill insured incurring long term care expenses. For example, a portion of the benefit that would be provided to a beneficiary upon the occurrence of an insured event may be provided to the insured if the insured becomes terminally ill. An insured may be terminally ill if a physician or other health care professional has diagnosed the insured as ill and having less than 12 months to live. An insured may similarly be terminally ill if a similar diagnosis of illness resulting in death is made, but wherein the life expectancy varies.

In addition to being terminally ill, the insured may need to incur at least some care expenses in order to be eligible to receive a portion of the benefit. These care expenses costs may be costs associated with an adult day care, an assisted living facility, a home health care agency, or a nursing facility. In this example, the amount of the benefit provided to the insured upon diagnosis with a terminal illness varies, but may be as much as the entire eligible benefit amount. For example, a terminally ill insured incurring sufficient care expenses may be advanced half of an in-force or paid-up benefit provided according to the method disclosed herein.

In addition to being configured to advance some or all of a benefit to which an insured is entitled, the coverage disclosed may be further configured to advance funds in excess of a benefit to which the insured is entitled. In various of the examples discussed above, if an insured is advanced some or all of an eligible benefit according to the disclosed method, an insured may be provided with additional funds exceeding the eligible benefit. For example, if an insured is unable to perform activities of daily living, is unable to provide for the insured's own safety and wellbeing, or is terminally ill, additional funds beyond the eligible benefit may be provided to the insured. In various of these examples, the insured may receive these additional funds without any party providing additional premium payments. In other examples, the insured may receive these additional funds even if previously-owed premium payments were waived as discussed above.

It should be appreciated that various combinations of the above provision of portions of the benefit prior to an insured event, waiver of premium payments, and provision of funds exceeding the benefit amount may be provided by the coverage disclosed herein.

The method disclosed herein may enable an insured to receive additional insurance coverage by providing additional premium payments. For example, the disclosed method may enable the insured to remit additional premiums to increase the in-force benefit or paid-up benefit accumulated under coverage as disclosed. The disclosed method may increase the in-force benefit during the coverage period by enabling the insured to purchase additional term insurance with additional premium payments. Alternatively, the disclosed method may enable the insured to receive an additional paid-up benefit in exchange for an additional premium payment. The determination of whether an additional premium payment is used to purchase paid-up insurance or term insurance may be made automatically, or may be a choice presented to and made by the insured. Finally, the method disclosed herein may enable the insured to purchase additional coverage in combination—that is, to purchase some additional term insurance and to purchase some additional paid-up insurance for a single premium payment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of insuring a plurality of individuals comprising:
　causing at least one processor to determine that a first premium payment of a plurality of level premium payments has been received on behalf of each of the plurality of individuals; and
　causing the at least one processor to generate evidence of coverage under an insurance policy to each of the plurality of individuals, wherein for an insured individual, the insurance policy obligates an insurer to:
　(a) disburse an in-force benefit to at least one beneficiary designated by the insured individual upon an occurrence of an insured event;
　(b) purchase a guaranteed insurance component based on a first portion of the first premium payment, the guaranteed insurance component:
　　(i) providing a first paid-up benefit, the first paid-up benefit being available only after a paid-up non-eligibility period, and
　　(ii) generating interest;
　(c) purchase a non-guaranteed insurance component based on the generated interest, the non-guaranteed insurance component providing a second paid-up benefit, the second paid-up benefit being available only after a paid-up non-eligibility period and the second paid-up benefit increasing the first paid-up benefit;
　(d) determine an accumulated paid-up benefit, the accumulated paid-up benefit being based on the sum of the first paid-up benefit and the second paid-up benefit;
　(e) if the accumulated paid-up benefit is less than the in-force benefit, purchase a term insurance component based on at least one selected from the group consisting of: a second portion of the first premium payment and the accumulated paid-up benefit;
　(f) if the accumulated paid-up benefit is not less than the in-force benefit, provide fully guaranteed paid-up coverage with a benefit equal to the greater of the accumulated paid-up benefit and the in-force benefit;
(g) provide at least a portion of the in-force benefit to the insured individual prior to an occurrence of the insured event if the insured individual is unable to perform without assistance at least two selected from the group consisting of: bathing, continence, dressing, eating, toileting, and ambulation, and if the insured individual incurs a care expense; and
(h) provide an amount in excess of the in-force benefit if the insured individual remains unable to perform without assistance at least two of bathing, continence, dressing, eating, toileting, and ambulation after the in-force benefit has been provided.

2. The method of claim 1, including receiving the first premium payment from one selected from the group consisting of: the insured individual and a third party.

3. The method of claim 1, wherein the evidence of coverage includes an insurance certificate.

4. The method of claim 1, wherein the insured event includes a death of the insured individual.

5. The method of claim 4, wherein the insured event is based on whether the death of the insured individual was accidental.

6. The method of claim 4, wherein the insured event is based on whether the death of the insured individual was caused by the insured individual.

7. The method of claim 1, wherein the guaranteed insurance component generates interest based on at least one selected from the group consisting of: at least one mortality credit and at least one excess interest credit.

8. The method of claim 1, wherein the in-force benefit decreases after a predefined level in-force benefit period.

9. The method of claim 8, wherein the predefined level in-force benefit period is based on at least one selected from the group consisting of: a number of years and an age of the insured individual.

10. The method of claim 8, wherein the in-force benefit decreases by approximately fifty percent after the expiration of the predefined level in-force benefit period.

11. The method of claim 1, including, if the accumulated paid-up benefit is not less than the in-force benefit, providing fully guaranteed paid-up coverage without receiving a further premium payment.

12. The method of claim 1, wherein continence includes the ability to control at least one selected from the group consisting of: bowel function and bladder function.

13. The method of claim 1, wherein toileting includes the ability to use toilet facilities and to perform the associated personal hygiene without physical assistance from a third party.

14. The method of claim 1, wherein ambulation includes the ability to move to or from at least one selected from the group consisting of: a bed, a wheelchair, a chair, and a chair.

15. A method of insuring a plurality of individuals comprising:
  causing at least one processor to determine that a first premium payment of a plurality of level premium payments has been received on behalf of each of the plurality of individuals; and
  causing the at least one processor to generate evidence of coverage under an insurance policy to each of the plurality of individuals, wherein for an insured individual, the insurance policy obligates an insurer to:
    (a) disburse an in-force benefit to at least one beneficiary designated by the insured individual upon an occurrence of an insured event;
    (b) purchase a guaranteed insurance component based on a first portion of the first premium payment, the guaranteed insurance component:
      (i) providing a first paid-up benefit, the first paid-up benefit being available only after a paid-up non-eligibility period, and
      (ii) generating interest;
    (c) purchase a non-guaranteed insurance component based on the generated interest, the non-guaranteed insurance component providing a second paid-up benefit, the second paid-up benefit being available only after a paid-up non-eligibility period and the second paid-up benefit increasing the first paid-up benefit;
    (d) determine an accumulated paid-up benefit, the accumulated paid-up benefit being based on the sum of the first paid-up benefit and the second paid-up benefit;
    (e) if the accumulated paid-up benefit is less than the in-force benefit, purchase a term insurance component based on at least one selected from the group consisting of: a second portion of the first premium payment and the accumulated paid-up benefit;
    (f) if the accumulated paid-up benefit is not less than the in-force benefit, provide fully guaranteed paid-up coverage with a benefit equal to the greater of the accumulated paid-up benefit and the in-force benefit;
    (g) provide at least a portion of the in-force benefit to the insured individual prior to an occurrence of the insured event if the insured individual requires supervision to protect the insured individual from threats to the health or safety of the insured individual, and if the insured individual incurs a care expense; and
    (h) provide an amount in excess of the in-force benefit if the insured individual continues to require supervision to protect the insured individual from threats to the health or safety of the insured individual after the in-force benefit has been provided.

16. The method of claim 15, including receiving the first premium payment from one selected from the group consisting of: the insured individual and a third party.

17. The method of claim 15, wherein the evidence of coverage includes an insurance certificate.

18. The method of claim 15, wherein the guaranteed insurance component generates interest based on at least one selected from the group consisting of: at least one mortality credit and at least one excess interest credit.

19. The method of claim 15, wherein the in-force benefit decreases after a predefined level in-force benefit period.

20. The method of claim 19, wherein the predefined level in-force benefit period is based on at least one selected from the group consisting of: a number of years and an age of the insured individual.

21. The method of claim 15, including, if the accumulated paid-up benefit is not less than the in-force benefit, providing fully guaranteed paid-up coverage without receiving a further premium payment.

22. A method of insuring a plurality of individuals comprising:
  causing at least one processor to determine that a first premium payment of a plurality of level premium payments has been received on behalf of each of the plurality of individuals; and
  causing the at least one processor to generate evidence of coverage under an insurance policy to each of the plurality of individuals, wherein for an insured individual, the insurance policy obligates an insurer to:

(a) disburse an in-force benefit to at least one beneficiary designated by the insured individual upon an occurrence of an insured event;
(b) purchase a guaranteed insurance component based on a first portion of the first premium payment, the guaranteed insurance component:
  (i) providing a first paid-up benefit, the first paid-up benefit being available only after a paid-up non-eligibility period, and
  (ii) generating interest;
(c) purchase a non-guaranteed insurance component based on the generated interest, the non-guaranteed insurance component providing a second paid-up benefit, the second paid-up benefit being available only after a paid-up non-eligibility period and the second paid-up benefit increasing the first paid-up benefit;
(d) determine an accumulated paid-up benefit, the accumulated paid-up benefit being based on the sum of the first paid-up benefit and the second paid-up benefit;
(e) if the accumulated paid-up benefit is less than the in-force benefit, purchase a term insurance component based on at least one selected from the group consisting of: a second portion of the first premium payment and the accumulated paid-up benefit;
(f) if the accumulated paid-up benefit is not less than the in-force benefit, provide fully guaranteed paid-up coverage with a benefit equal to the greater of the accumulated paid-up benefit and the in-force benefit; and
(g) provide at least a first portion of the in-force benefit to the insured individual prior to an occurrence of the insured event if at least one disbursement criterion is satisfied, the disbursement criterion being selected from the group consisting of:
  (i) the insured individual is unable to perform without assistance at least two selected from the group consisting of: bathing, continence, dressing, eating, toileting, and ambulation, and the insured individual incurs a care expense;
  (ii) the insured individual requires supervision to protect the insured individual from threats to the health or safety of the insured individual, and the insured individual incurs a care expense; and
  (iii) the insured individual is terminally ill.

23. The method of claim 22, wherein the first portion of the in-force benefit is at least half of the in-force benefit.

24. The method of claim 22, including providing a second portion of the in-force benefit to the insured individual prior to an occurrence of the insured event if said at least one disbursement criterion remains satisfied for a predefined period of time.

25. The method of claim 24, wherein the predefined period of time is based on an elapsed time between receiving a first premium payment and a second premium payment.

26. The method of claim 25, wherein the predefined period of time is one year.

27. The method of claim 22, wherein continence includes the ability to control at least one selected from the group consisting of: bowel function and bladder function.

28. The method of claim 22, wherein toileting includes the ability to use toilet facilities and to perform the associated personal hygiene without physical assistance from a third party.

29. The method of claim 22, wherein ambulation includes the ability to move to or from at least one selected from the group consisting of: a bed, a wheelchair, a chair, and a chair.

30. A method of insuring a plurality of individuals comprising:
causing at least one processor to determine that a first premium payment of a plurality of level premium payments has been received on behalf of each of the plurality of individuals;
causing the at least one processor to generate evidence of coverage under an insurance policy to each of the plurality of individuals, wherein for an insured individual, the insurance policy obligates an insurer to:
(a) disburse an in-force benefit to at least one beneficiary designated by the insured individual upon an occurrence of an insured event;
(b) purchase a guaranteed insurance component based on a first portion of the first premium payment, the guaranteed insurance component:
  (i) providing a first paid-up benefit, the first paid-up benefit being available only after a paid-up non-eligibility period, and
  (ii) generating interest;
(c) purchase a non-guaranteed insurance component based on the generated interest, the non-guaranteed insurance component providing a second paid-up benefit, the second paid-up benefit being available only after a paid-up non-eligibility period and the second paid-up benefit increasing the first paid-up benefit;
(d) determine an accumulated paid-up benefit, the accumulated paid-up benefit being based on the sum of the first paid-up benefit and the second paid-up benefit;
(e) if the accumulated paid-up benefit is less than the in-force benefit, purchase a term insurance component based on at least one selected from the group consisting of: a second portion of the first premium payment and the accumulated paid-up benefit; and
(f) if the accumulated paid-up benefit is not less than the in-force benefit, provide fully guaranteed paid-up coverage with a benefit equal to the greater of the accumulated paid-up benefit and the in-force benefit;
causing the at least one processor to determine that at least one additional optional premium payment has been received from the individual; and
increasing the in-force benefit by purchasing at least one selected from the group consisting of: an additional guaranteed insurance component having an additional paid-up benefit and an additional term insurance component using the additional optional premium payment.

31. The method of claim 30, wherein the guaranteed insurance component generates interest based on at least one selected from the group consisting of: at least one mortality credit and at least one excess interest credit.

32. The method of claim 30, wherein the in-force benefit decreases after a predefined level in-force benefit period.

33. The method of claim 32, wherein the predefined level in-force benefit period is based on at least one selected from the group consisting of: a number of years and an age of the insured individual.

34. A method of insuring a plurality of individuals comprising:
causing at least one processor to determine that a first premium payment of a plurality of level premium payments has been received on behalf of each of the plurality of individuals;
enabling at least one of the plurality of insured individuals to provide an additional optional premium payment with each of the plurality of level premium payments; and
causing the at least one processor to generate evidence of coverage under an insurance policy to each of the plurality of individuals, wherein for an insured individual, the insurance policy obligates an insurer to:

(a) disburse an in-force benefit to at least one beneficiary designated by the insured individual upon an occurrence of an insured event;
(b) purchase a guaranteed insurance component based on a first portion of the first premium payment, the guaranteed insurance component:
   (i) providing a first paid-up benefit, the first paid-up benefit being available only after a paid-up non-eligibility period, and
   (ii) generating interest;
(c) purchase a non-guaranteed insurance component based on the generated interest, the non-guaranteed insurance component providing a second paid-up benefit, the second paid-up benefit being available only after a paid-up non-eligibility period and the second paid-up benefit increasing the first paid-up benefit;
(d) determine an accumulated paid-up benefit, the accumulated paid-up benefit being based on the sum of the first paid-up benefit and the second paid-up benefit;
(e) if the accumulated paid-up benefit is less than the in-force benefit, purchase a term insurance component based on at least one selected from the group consisting of: a second portion of the first premium payment and the accumulated paid-up benefit;
(f) if the accumulated paid-up benefit is not less than the in-force benefit, provide fully guaranteed paid-up coverage with a benefit equal to the greater of the accumulated paid-up benefit and the in-force benefit; and
(g) purchase an additional term insurance component using the additional optional premium payment, the additional term insurance component increasing the in-force benefit.

35. The method of claim 34, including enabling at least one of the plurality of individuals to elect whether to provide the additional optional premium payment.

36. The method of claim 34, including enabling at least one of the plurality of individuals to elect an amount for the additional optional premium payment, wherein an amount of increase of the in-force benefit by the additional term insurance component is based on the elected amount for the additional optional premium payment.

37. A method of insuring a plurality of individuals comprising:
   causing at least one processor to determine that a first premium payment of a plurality of level premium payments has been received on behalf of each of the plurality of individuals; and
   causing the at least one processor to generate evidence of coverage under an insurance policy to each of the plurality of individuals, wherein for an insured individual, the insurance policy obligates an insurer to:
(a) disburse an in-force benefit to at least one beneficiary designated by the insured individual upon an occurrence of an insured event;
(b) purchase a guaranteed insurance component based on a first portion of the first premium payment, the guaranteed insurance component:
   (i) providing a first paid-up benefit, the first paid-up benefit being available only after a paid-up non-eligibility period, and
   (ii) generating interest;
(c) purchase a non-guaranteed insurance component based on the generated interest, the non-guaranteed insurance component providing a second paid-up benefit, the second paid-up benefit being available only after a paid-up non-eligibility period and the second paid-up benefit increasing the first paid-up benefit;
(d) determine an accumulated paid-up benefit, the accumulated paid-up benefit being based on the sum of the first paid-up benefit and the second paid-up benefit;
(e) if the accumulated paid-up benefit is less than the in-force benefit, purchase a term insurance component based on at least one selected from the group consisting of: a second portion of the first premium payment and the accumulated paid-up benefit;
(f) if the accumulated paid-up benefit is not less than the in-force benefit, provide fully guaranteed paid-up coverage with a benefit equal to the greater of the accumulated paid-up benefit and the in-force benefit; and
(g) waive any premium payment received on behalf of the insured individual if the insured individual becomes disabled.

38. The method of claim 37, wherein a determination of when the insured individual becomes disabled is based on a mental condition of the insured individual.

39. The method of claim 37, wherein a determination of when the insured individual becomes disabled is based on a physical condition of the insured individual.

40. The method of claim 37, including requiring proof of disability provided by a medical professional.

* * * * *